US012580488B2

(12) United States Patent
Yurick

(10) Patent No.: US 12,580,488 B2
(45) Date of Patent: Mar. 17, 2026

(54) HIGH-DENSITY MULTI-CHANNEL POWER SUPPLY IN A TEST AND MEASUREMENT INSTRUMENT

(71) Applicant: Keithley Instruments, LLC, Solon, OH (US)

(72) Inventor: Benjamin J. Yurick, Garrettsville, OH (US)

(73) Assignee: Keithley Instruments, LLC, Solon, OH (US)

( * ) Notice: Subject to any disclaimer, the term of this patent is extended or adjusted under 35 U.S.C. 154(b) by 513 days.

(21) Appl. No.: 18/159,729

(22) Filed: Jan. 26, 2023

(65) Prior Publication Data

US 2023/0253887 A1    Aug. 10, 2023

Related U.S. Application Data

(60) Provisional application No. 63/306,924, filed on Feb. 4, 2022.

(51) Int. Cl.
| | |
|---|---|
| *H02M 3/335* | (2006.01) |
| *H02M 1/00* | (2006.01) |
| *H02M 1/084* | (2006.01) |
| *H02M 1/42* | (2007.01) |

(52) U.S. Cl.
CPC ..... *H02M 3/33569* (2013.01); *H02M 1/0012* (2021.05); *H02M 1/0845* (2013.01); *H02M*

*3/33515* (2013.01); *H02M 1/4258* (2013.01); *H02M 3/33561* (2013.01)

(58) Field of Classification Search
CPC ........................ H02M 1/4258; H02M 3/33561
See application file for complete search history.

(56) References Cited

U.S. PATENT DOCUMENTS

| | | | | |
|---|---|---|---|---|
| 8,125,104 B2 * | 2/2012 | Meagher | ........... | H02M 3/33561 |
| | | | | 307/75 |
| 9,013,239 B2 * | 4/2015 | Buono | ................. | H02M 3/285 |
| | | | | 330/297 |
| 2020/0271717 A1 * | 8/2020 | Nakamura | ........... | H05K 1/0262 |

* cited by examiner

*Primary Examiner* — Gary A Nash
(74) *Attorney, Agent, or Firm* — Miller Nash LLP; Andrew J. Harrington; Krista Y. Chan

(57)    ABSTRACT

A power supply block has multiple isolated power channels, the power supply comprising an interface magnetic component having multiple windings, each winding connected to a separate one of the isolated channels. A test and measurement instrument has a connector to allow the instrument to connect to a device under test, and a power supply block having multiple isolated power channels, the power supply block comprising an interface magnetic component having multiple windings, each winding connected to a separate one of the isolated power channels.

21 Claims, 5 Drawing Sheets

3.3V NON OVERLAPPING
DRIVE WAVEFORMS

HIGH-DENSITY MULTI-CHANNEL POWER SUPPLY IN A TEST AND MEASUREMENT INSTRUMENT

CROSS-REFERENCE TO RELATED APPLICATION

This disclosure claims benefit of U.S. Provisional Application No. 63/306,924, titled "HIGH-DENSITY MULTI-CHANNEL POWER SUPPLY IN A TEST AND MEASUREMENT INSTRUMENT," filed on Feb. 4, 2022, the disclosure of which is incorporated herein by reference in its entirety.

TECHNICAL FIELD

This disclosure relates to test and measurement instruments, and more particularly to a power supply subsystem for a test and measurement instrument.

BACKGROUND

Multi-channel product designs that require high density, channel count and/or volume, have substantial challenges to the power supply subsystem if they require individual channel supplies. Source Measure Units (SMU), for example, require individual isolated power supplies with outputs independent from each other. A further challenge arises because typically a portion of the hardware circuits reference to a customer output, meaning that the output ground does not reference to Earth ground. The output grounds are galvanically isolated from Earth ground and are typically referred to as "floating."

For an N-channel system, a challenge arises in providing N isolated supplies with space efficiency in a high-density design. Magnetic components for power supplies can easily make up the largest components in the design. For bipolar, analog SMU designs, this issue becomes exacerbated by requiring split winding or center tap (CT) winding transformer designs. Common solutions involve custom designed magnetic components. These solutions either do not scale or make achieving small sizes extremely difficult.

DESCRIPTION

Embodiments here involve a power supply block. As used herein, the term "power supply block" means a power supply section or portion that provides multiple isolated channels in a small space, to differentiate it from what may be considered conventional commercial power supplies available in the test and measurement equipment market. A power supply in the test and measurement market may employ one or more power supply blocks of the embodiments, as could other test and measurement equipment such as source measurement units (SMU), oscilloscopes, digital multimeters, etc. No limitation to any particular type of test and measurement equipment is intended. The below discussions use an example of an SMU, but only for ease of understanding the embodiments.

The power supply block uses an interface magnetic component to provide multiple isolated transformers capable of providing multiple isolated power channels in the power supply block of the embodiments. A single power supply block may use more than one interface magnetics component to provide multiple channels, or the power supply block may be repeated as needed to provide a desired number of isolated power channels. The interface magnetics component comprises a number of transformers encapsulated in an integrated circuit component. This allows the resulting power supplies to achieve the desired high density while maintaining isolation, not otherwise obtainable using current methods.

Figure 1:
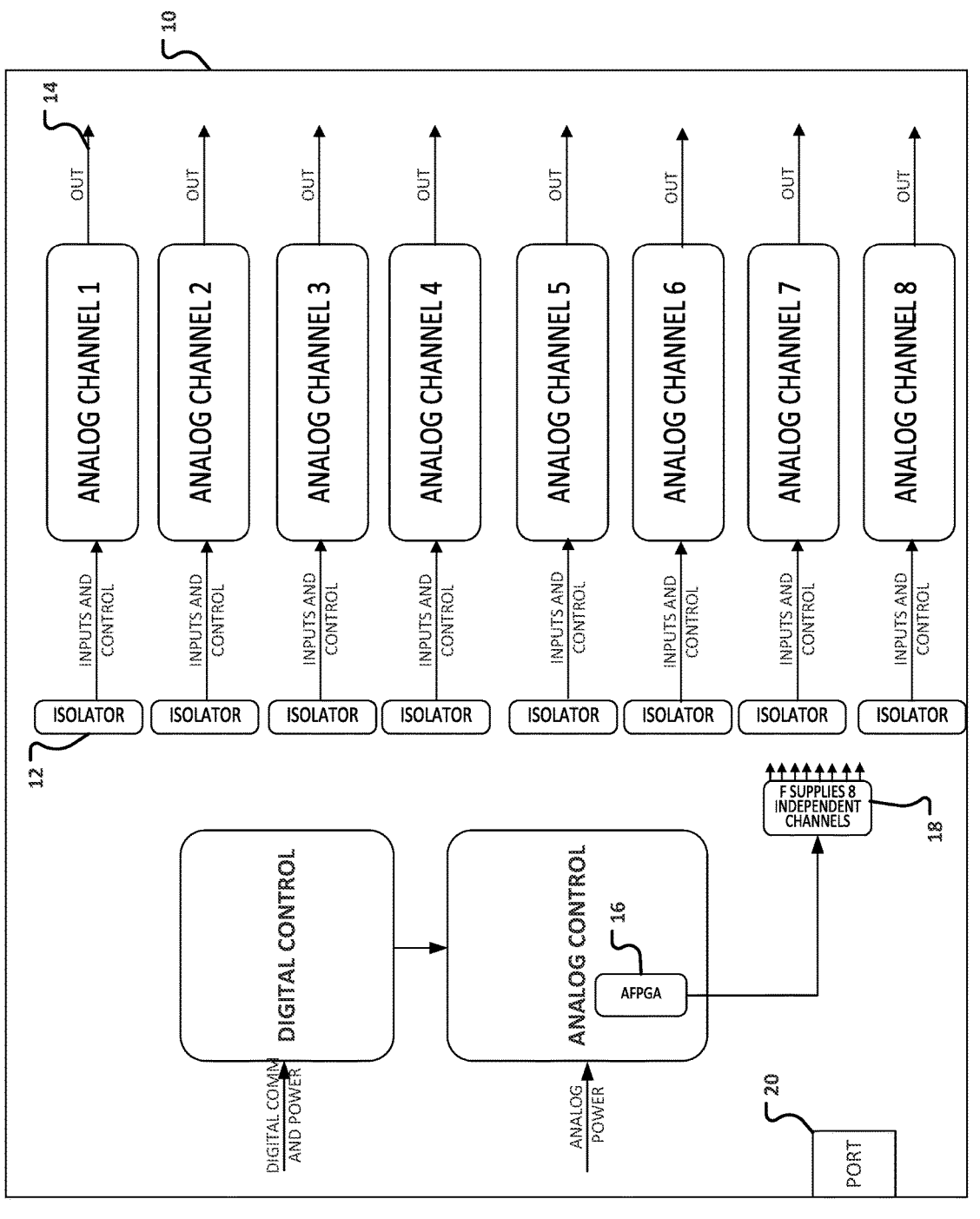
FIG. 1 shows an example of a test and measurement device having a multi-channel power supply block with isolated floating circuits.

As mentioned above, the discussion uses an SMU as an example of equipment into which the power supply block of the embodiments may be incorporated. FIG. 1 shows a test and measurement device, in this case an SMU, having a power supply block with eight independent channels with floating sections requiring eight independent power supplies. FIG. 1 shows the circuits that need isolation. These include the isolators such as 12, the outputs of the channels such as 14, and the common driver 18. These isolated circuits require relatively low power to operate. As mentioned previously, the term "floating" means that the channels will connect to a ground provided by the customer/user and have galvanic isolation from Earth ground.

The digital control circuitry receives digital communications, usually in the form of control signals, and digital power through a connector. The analog control circuitry receives analog power from an analog connector. The analog control circuitry includes the AFPGA 16, that produces the drive signals used to produce the signals for the 8 independent channels. This will also provide signals used in the current embodiments. The test and measurement device 10 will include a port 20 or other connector that allows the device 10 to connect to a device under test. It may include other circuit elements, such as analog-to-digital converters (ADC), user interface controls such as buttons and knobs, a display, and one or more processors. The test and measurement device may comprise an SMU or other source, a digital multimeter, an oscilloscope, an analyzer, a signal generator, just as examples.

Current solutions include the use of individual transformer components. In a high density design, these would strive to take up as little physically space as possible. For example a first device has a size of 13.34 mm, and a second device having a size of 13 mm. Table 1 shows a comparison of these components, the estimated routing area resulting from them, and the area for using the component in an exemplary 8-channel solution. One should note that the examples here will often refer to an 8-channel solution, but no limitation is intended to this particular example, nor should any be implied.

Another option would use a custom, multi-output, compact transformer, just as a typical example. One example has a size of 12.7×12.5 mm. Some designers may fashion a custom magnetics design to contain multiple output windings to accommodate the separate individual channels. This can provide relatively compact solution for smaller channel counts but becomes quickly non-viable as the number of required channels increases. Table 1 shows a comparison of estimated sizes of an 8 channel solution is shown for the above solutions.

TABLE 1

| Implementation size estimates of traditional solutions | | | |
| --- | --- | --- | --- |
| Supported # Channels (ea) | Component Area (mm) | Estimated Routing Area (mm$^2$) | Area for 8 CH Solution (mm$^2$) |
| 1 (20) | 11 × 13.34 | 130 | 2214 |
| 2 (22) | 13 × 13 | 160 | 1316 |
| 2 (24) | 12.7 × 12.5 | 160 | 1275 |

Provided that the power levels needed have compatibility with the design requirements, one can repurpose a digital interface magnetic component for use in multi-channel power supply applications. The novel use of this component achieves an extraordinary reduction in the implementation of 8 isolated channels. One example of this type of component has 8 windings and is roughly 28×16 mm. The area for an 8-channel design comprises is 714 mm$^2$, a substantial space savings over the other designs shown in Table 1 that have footprints of well over 1000 mm$^2$, while this design is well under 1000 mm$^2$.

The digital interface magnetic component, or interface magnetic component, typically operates in telecommunications system. It has never before appeared in power supply design. In one example, the communications link typically has two ends, a terminal equipment (TE) end that receives local AC power. The TE integrated circuit card connects to the secondary windings of the component and the primary windings are connected to the primary windings at the other end, network termination (NT) end. The NT circuit card connects to the secondary windings connected to the NT circuit card. This just provides an example to show the typical use of such a component.

Figure 2:
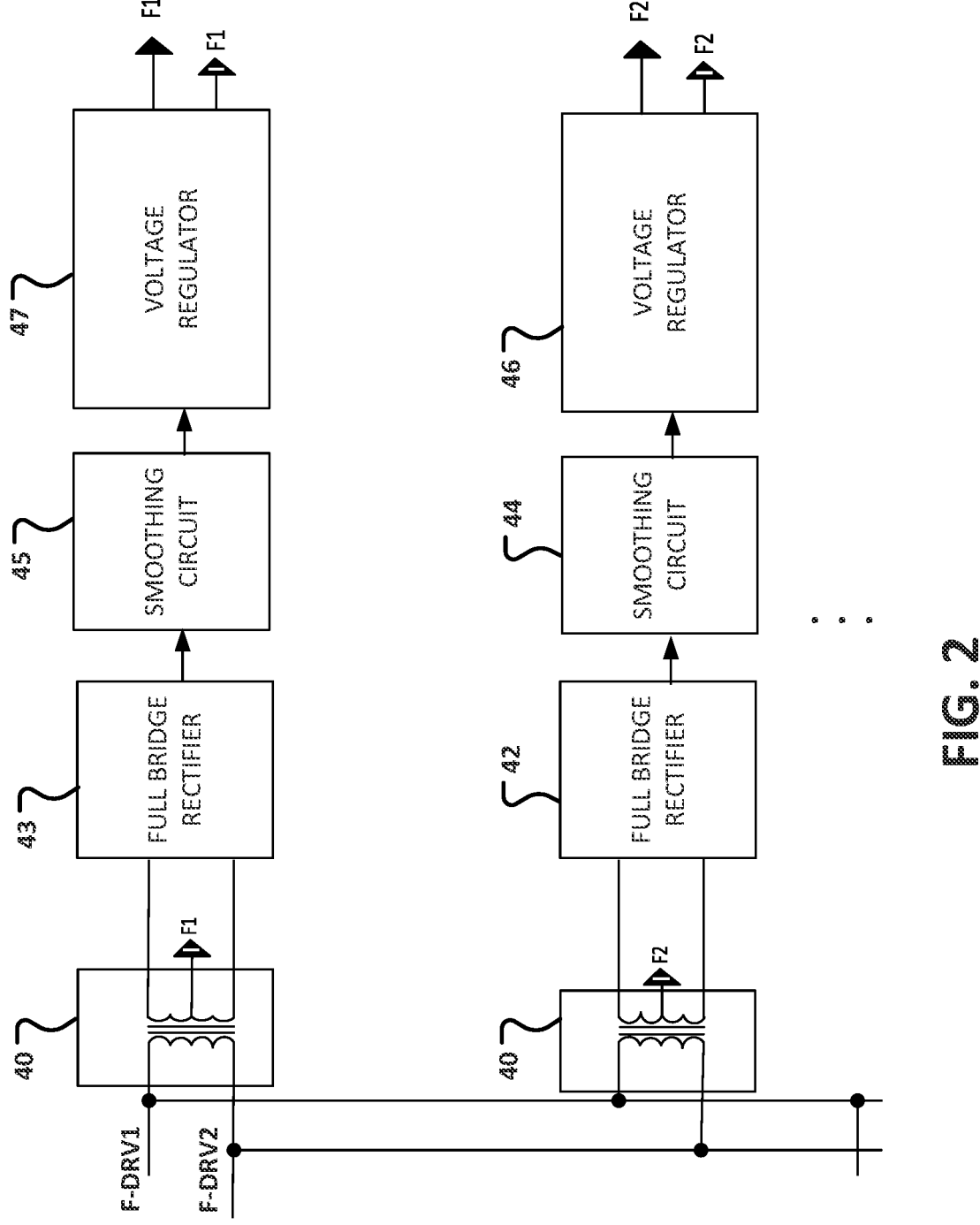
FIG. 2 shows an embodiment of a multi-channel floating power supply block.

Returning to FIG. 1, this component would take the place of the common channel driver 18. As will be discussed in more detail further, the component may have a custom driver circuit. FIG. 2 shows embodiments of channels in a multi-channel power supply block such as usable in an SMU or other test equipment. FIG. 2 shows only two channels, each employing one winding from the interface component 40, with the understanding that the channels replicate as many times as needed. The top circuit in the diagram would be for channel 1, the bottom circuit would be channel 2, etc. These would replicate as many times as needed for however many channels and the separation between the two windings is much smaller than shown. The same interface component 40 contains all the windings within the small footprint but is shown in two different locations for ease of understanding. As mentioned above, the power supply block itself could be repeated, the power supply block may include more than one 8-transformer magnetic interface component, or use a magnetic interface component having more than 8 transformers, among other scenarios.

Each channel has several portions, each with a particular purpose.

In FIG. 2, the lower channel operates on one winding 40 from the interface magnetics component. The winding, in this case the center tap, connects to the full bridge rectifier 42 that converts the AC power from the winding to DC. The smoothing circuit 44 smooths out the output of the rectifier to provide a smoother DC signal. A voltage regulator 46, regulates the DC power to provide DC output signals of both positive and negative polarities. The voltage regulator may include voltage regulating integrated circuits, a resistor-capacitor network that sets the voltage value and provides further voltage regulation, and a fixed regulator with no ability to set the voltage, but provides good output positive and negative voltages at the F2 output terminals. The smoothing circuit and fixed regulator are merely some optional circuits that may be included in the voltage regulator 46. These components are replicated for the first channel as full-bridge rectifier 43, smoothing circuit 45 and voltage regulator 47, producing positive and negative output power signals F1.

Figure 3:
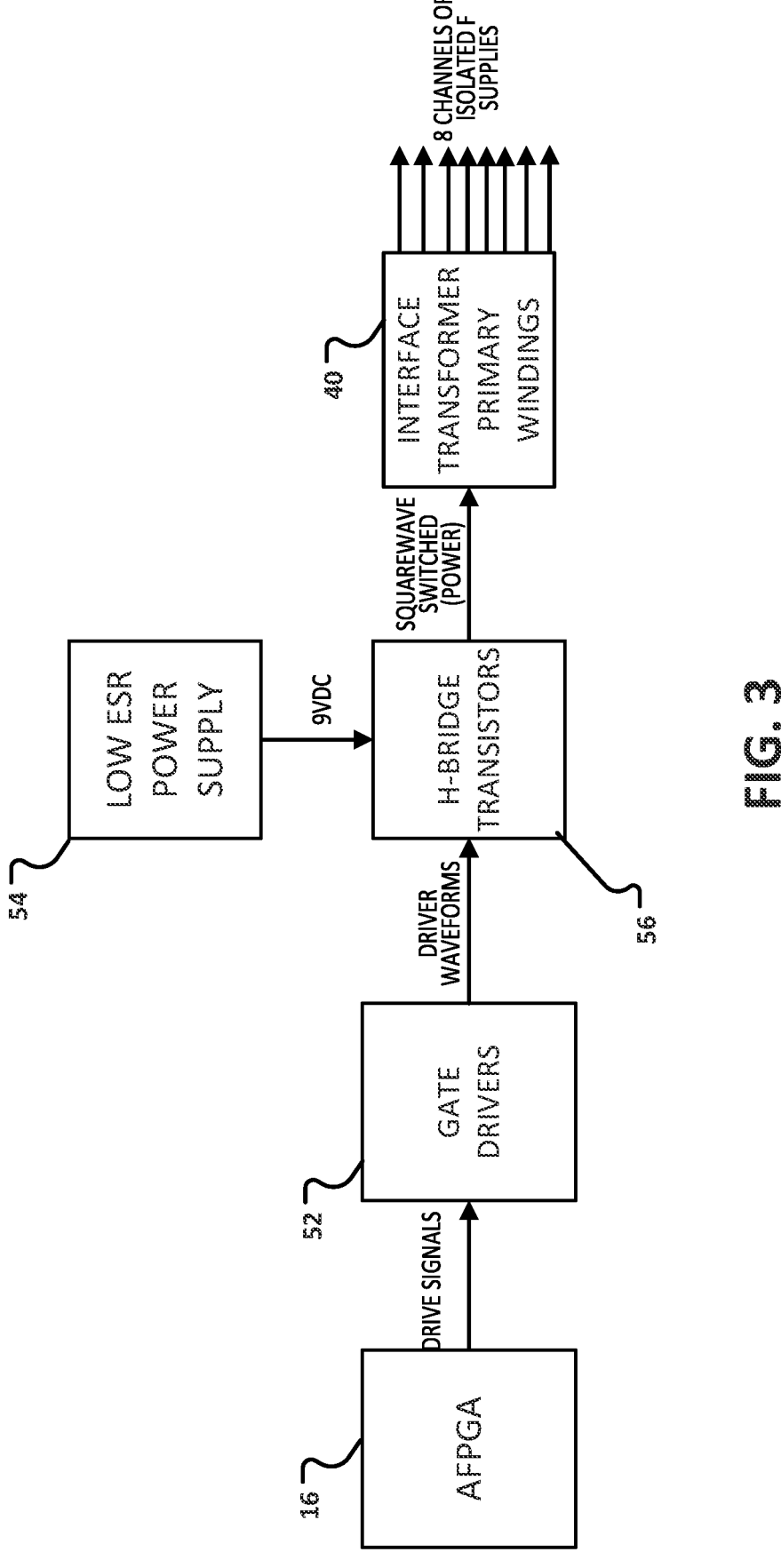
FIG. 3 shows a block diagram of a driver block.

As can be seen in the far left of FIG. 2, one can see that the windings have two input signals, F-DRV1 and F-DRV2. These drive signals may result from a custom driving circuit. FIG. 3 shows an overall diagram for the context of the driving circuit.

Figure 4:
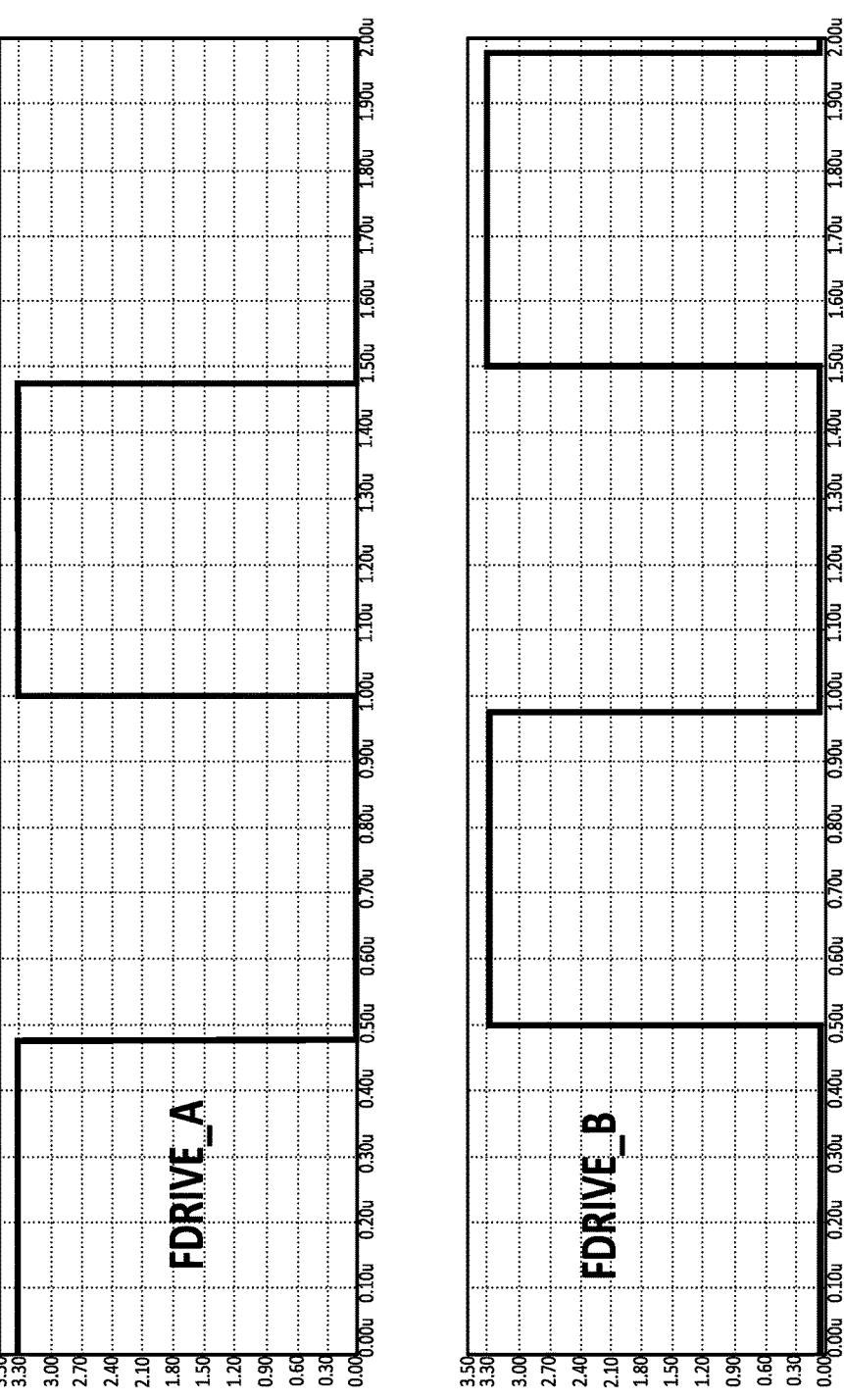
FIG. 4 shows a display of non-overlapping driver waveforms.

Referring back to FIG. 1, the AFPGA 16 provides the drive signals to gate drivers 52 of FIG. 3. In one embodiment, the AFPGA supplies drive signals, FDRIVE_A and FDRIVE_B to the gate drivers 52. A low ESR (equivalent series resistance) power supply 54 provides a DC voltage to the H-bridge transistors 56. This allows the H-bridge 56 to product the two driving signals F-DRV1 and F-DRV2 signals used by the windings in the interface magnetic component 40 to produce however many isolated channels of power are available in the interface magnetic component 40. FIG. 4 shows an example of these driving signals. In one embodiment, the driving signals are 3.3 V non-overlapping drive waveforms. Generally, the power supply block will be considered low power, consuming less than 2 W, or in some cases less than 5 W.

Figure 5:
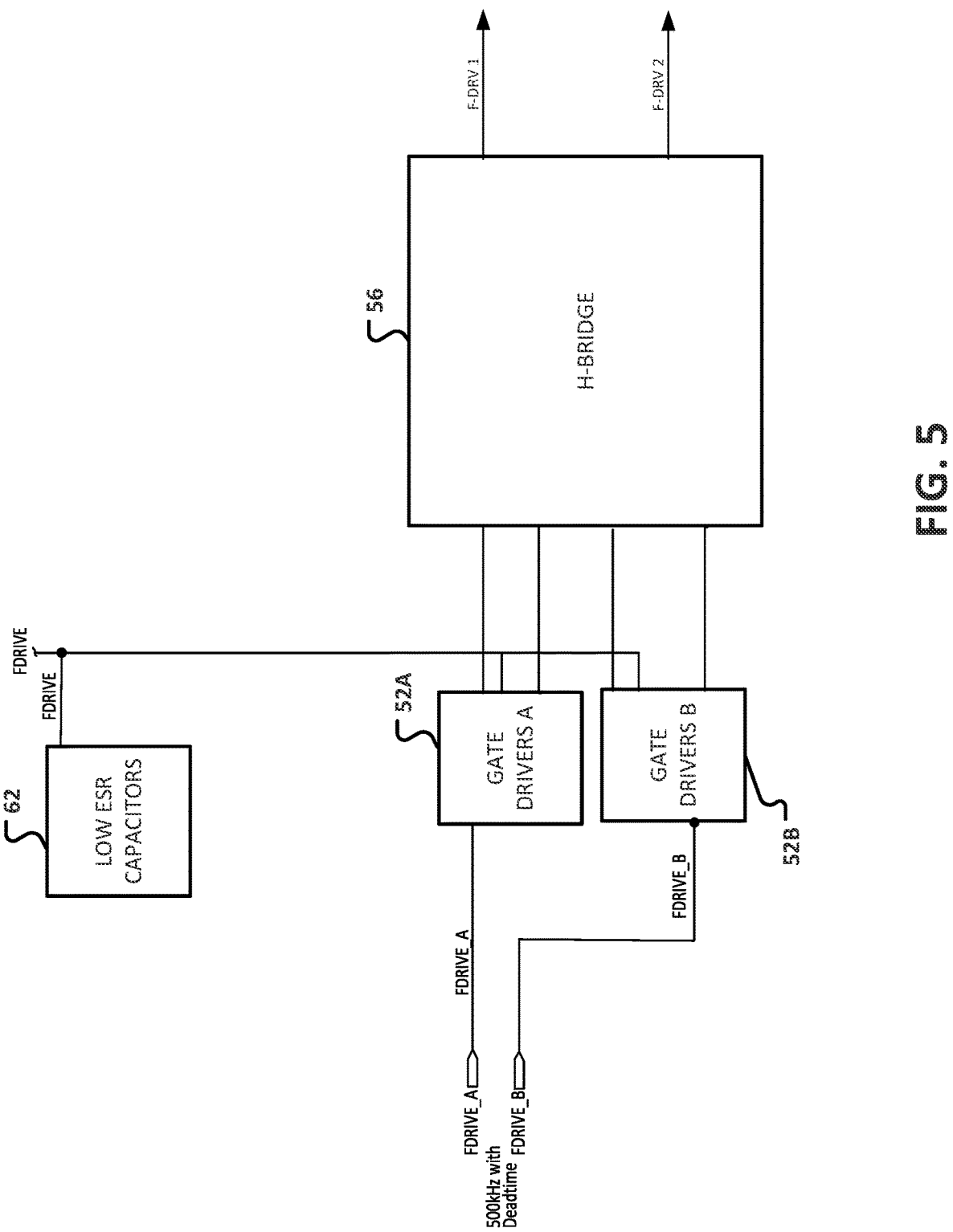
FIG. 5 shows a circuit diagram of an embodiment of a driver block.

FIG. 5 shows an embodiment of a high frequency driver developed to operate to drive this component. In one embodiment, the frequency is at least 1 MHz. This driver delivers the power levels and voltage rails required. In one embodiment, the power levels and voltage rails are for all of the 8 isolated channels in a multi-channel SMU application. Without the driver, it would be quite difficult to reproduce the equivalent of such a compact arrangement with commonly available resources to OEMs. Moreover, the packaging in a compact standard integrated circuit footprint allows the normal usage of automated assembly equipment to place this component onto a PCB using known techniques.

In FIG. 5 the driver circuit receives the FDRIVE_A and FDRIVE_B signals from the AFPGA, and they act as inputs to the gate drivers 52A and 52B. The low ESR power supply provides a DC power FDRIVE to the H-bridge. The bulk low ESR capacitance 62 acts on the FDRIVE signal to feed current to the high speed switching converter in the H-bridge. In one embodiment the H-bridge comprises a set of four switching transistors in an H-bridge configuration having a dual arrangement. The H-bridge may contain other components such as RC components slow the switching speed to reduce the electrical noise. The outputs from the H-bridge circuit comprise the F-DRV1 and F-DRV2 inputs to the transformers of FIG. 2.

In this manner, a off the shelf, small footprint, component used in the telecommunications industry can be repurposed to provide isolated power signals to a multi-channel SMU. The embodiments include a driver that allows the component to be able to function correctly in the SMU environment.

The disclosed aspects may be implemented, in some cases, in hardware, firmware, software, or any combination thereof. References made above to FPGAs and other integrated circuits such as voltage regulators, etc., may be replaced with any component that can perform the same functions. The disclosed aspects may also be implemented as instructions carried by or stored on one or more or non-transitory computer-readable media, which may be read and executed by one or more processors. Such instructions may be referred to as a computer program product. Computer-readable media, as discussed herein, means any media that can be accessed by a computing device. By way of example, and not limitation, computer-readable media may comprise computer storage media and communication media.

Computer storage media means any medium that can be used to store computer-readable information. By way of example, and not limitation, computer storage media may include RAM, ROM, Electrically Erasable Programmable Read-Only Memory (EEPROM), flash memory or other memory technology, Compact Disc Read Only Memory (CD-ROM), Digital Video Disc (DVD), or other optical disk storage, magnetic cassettes, magnetic tape, magnetic disk storage or other magnetic storage devices, and any other volatile or nonvolatile, removable or non-removable media implemented in any technology. Computer storage media excludes signals per se and transitory forms of signal transmission.

Additionally, this written description makes reference to particular features. It is to be understood that the disclosure in this specification includes all possible combinations of those particular features. For example, where a particular feature is disclosed in the context of a particular aspect, that feature can also be used, to the extent possible, in the context of other aspects.

Also, when reference is made in this application to a method having two or more defined steps or operations, the defined steps or operations can be carried out in any order or simultaneously, unless the context excludes those possibilities.

Although specific aspects of the disclosure have been illustrated and described for purposes of illustration, it will be understood that various modifications may be made without departing from the spirit and scope of the disclosure. Accordingly, the disclosure should not be limited except as by the appended claims.

EXAMPLES

Illustrative examples of the disclosed technologies are provided below. An embodiment of the technologies may include one or more, and any combination of, the examples described below.

Example 1 is a power supply block having multiple isolated power channels, the power supply comprising an interface magnetic component having multiple windings, each winding connected to a separate one of the isolated channels.

Example 2 is the power supply block of Example 1, wherein each isolated channel further comprises: a full bridge rectifier electrically connected to one winding of the interface magnetics component to convert incoming power from the winding to a direct current signal; a voltage regulator to regulate voltage from the full bridge rectifier to a desired level and polarity; and at least one output terminal to output a signal isolated from outputs of other channels.

Example 3 is the power supply block of Example 2, wherein the full bridge rectifier of each channel connects to the center tap of the winding for that channel.

Example 4 is the power supply block of either of Examples 2 or 3, wherein each channel further comprises a smoothing circuit between the full bridge rectifier circuit and the voltage regulator.

Example 5 is the power supply block of any of Examples 1 through 4 further comprising a driver circuit connected to the interface magnetics component.

Example 6 is the power supply block of Example 5, wherein the driver circuit includes an H-bridge circuit.

Example 7 is the power supply block of either of Examples 5 or 6, wherein the driver circuit operates at a frequency of at least 1 MHz.

Example 8 is the power supply block of any of Examples 5 through 7, wherein the driver circuit receives two drive signals as inputs.

Example 9 is the power supply block of any of Examples 5 through 8, wherein the inputs are non-overlapping square wave signals.

Example 10 is the power supply block of any of Examples 5 through 9, wherein the driver circuit generates two output driving signals and transmits the output driving signals to the interface magnetics component.

Example 11 is the power supply block of any of Examples 1 through 10, wherein the interface magnetic component has a footprint of less than 1000 mm$^2$.

Example 12 is the power supply block of any of Examples 1 through 10, wherein the power supply block consumes less than 5 W of power.

Example 13 is a test and measurement instrument, comprising: a connector to allow the instrument to connect to a device under test; and a power supply block having multiple isolated power channels, the power supply block comprising an interface magnetic component having multiple windings, each winding connected to a separate one of the isolated power channels.

Example 14 is the test and measurement instrument of Example 13, wherein each isolated channel further comprises: a full bridge rectifier electrically connected to one winding of the interface magnetics component to convert incoming power from the winding to a direct current signal; a voltage regulator to regulate voltage from the full bridge rectifier to a desired level and polarity; and at least one output terminal to output a signal isolated from outputs of other channels.

Example 15 is the test and measurement instrument of either Examples 13 or 14, wherein the full bridge rectifier of each channel connects to the center tap of the winding for that channel.

Example 16 is the test and measurement instrument of any of Examples 13 through 15, wherein each channel further comprises a smoothing circuit between the full bridge rectifier circuit and the voltage regulator.

Example 17 is the test and measurement instrument of any of Examples 13 through 16 further comprising a driver circuit connected to the interface magnetics component.

Example 18 is the test and measurement instrument of Example 17, wherein the driver circuit operates at a frequency of at least 1 MHz.

Example 19 is the power supply block of either Examples 17 or 18, wherein the driver circuit receives two drive signals as inputs.

Example 20 is the power supply block of any of Examples 17 through 19, wherein the inputs are non-overlapping square wave signals.

The previously described versions of the disclosed subject matter have many advantages that were either described or would be apparent to a person of ordinary skill. Even so, these advantages or features are not required in all versions of the disclosed apparatus, systems, or methods.

Additionally, this written description makes reference to particular features. It is to be understood that the disclosure in this specification includes all possible combinations of those particular features. Where a particular feature is disclosed in the context of a particular aspect or example, that feature can also be used, to the extent possible, in the context of other aspects and examples.

Also, when reference is made in this application to a method having two or more defined steps or operations, the defined steps or operations can be carried out in any order or simultaneously, unless the context excludes those possibilities.

Although specific examples of the invention have been illustrated and described for purposes of illustration, it will be understood that various modifications may be made without departing from the spirit and scope of the invention. Accordingly, the invention should not be limited except as by the appended claims.

What is claimed is:

1. A power supply block having:
multiple isolated power channels; and
an interface magnetic component having multiple windings, each winding connected to a separate one of the multiple isolated power channels, wherein the interface magnetic component has a footprint of less than 1000 mm².

2. The power supply block as claimed in claim 1, wherein each isolated power channel further comprises:
a full bridge rectifier electrically connected to one winding of the interface magnetic component to convert incoming power from the winding to a direct current signal;
a voltage regulator to regulate voltage from the full bridge rectifier to a desired level and polarity; and
at least one output terminal to output a signal isolated from outputs of other isolated power channels.

3. The power supply block as claimed in claim 2, wherein the full bridge rectifier of each isolated power channel connects to a center tap of the winding for that isolated power channel.

4. The power supply block as claimed in claim 2, wherein each isolated power channel further comprises a smoothing circuit between the full bridge rectifier and the voltage regulator.

5. The power supply block as claimed in claim 1 further comprising a driver circuit connected to the interface magnetic component.

6. The power supply block as claimed in claim 5, wherein the driver circuit includes an H-bridge circuit.

7. The power supply block as claimed in claim 5, wherein the driver circuit operates at a frequency of at least 1 MHz.

8. The power supply block as claimed in claim 5, wherein the driver circuit receives two drive signals as inputs.

9. The power supply block as claimed in claim 8, wherein the inputs are non-overlapping square wave signals.

10. The power supply block as claimed in claim 5, wherein the driver circuit generates two output driving signals and transmits the output driving signals to the interface magnetic component.

11. The power supply block as claimed in claim 1, wherein the power supply block consumes less than 5 W of power.

12. A test and measurement instrument, comprising:
a connector to allow the test and measurement instrument to connect to a device under test; and a power supply block having multiple isolated power channels, the power supply block comprising an interface magnetic component having multiple windings, each winding connected to a separate one of the isolated power channels wherein the interface magnetic component has a footprint of less than 1000 mm².

13. The test and measurement instrument as claimed in claim 12, wherein each isolated power channel further comprises:
a full bridge rectifier electrically connected to one winding of the interface magnetic component to convert incoming power from the winding to a direct current signal;
a voltage regulator to regulate voltage from the full bridge rectifier to a desired level and polarity; and
at least one output terminal to output a signal isolated from outputs of other isolated power channels.

14. The test and measurement instrument as claimed in claim 13, wherein the full bridge rectifier of each isolated power channel connects to a center tap of the winding for that isolated power channel.

15. The test and measurement instrument as claimed in claim 14, wherein each isolated power channel further comprises a smoothing circuit between the full bridge rectifier and the voltage regulator.

16. The test and measurement instrument as claimed in claim 12 further comprising a driver circuit connected to the interface magnetic component.

17. The test and measurement instrument as claimed in claim 16, wherein the driver circuit operates at a frequency of at least 1 MHz.

18. The test and measurement instrument as claimed in claim 16, wherein the driver circuit receives two drive signals as inputs.

19. The test and measurement instrument as claimed in claim 18, wherein the inputs are non-overlapping square wave signals.

20. A power supply block having:
multiple isolated power channels; and
an interface magnetic component having multiple windings, each winding connected to a separate one of the isolated power channels;
wherein each of the multiple isolated power channels comprises:
a full bridge rectifier electrically connected to one winding of the interface magnetics component to convert incoming power from the winding to a direct current signal;
a voltage regulator to regulate voltage from the full bridge rectifier to a desired level and polarity; and
at least one output terminal to output a signal isolated from outputs of other isolated power channels; and
wherein the full bridge rectifier of each isolated power channel connects to a center tap of the winding for that isolated power channel.

21. A test and measurement instrument, comprising:
a connector to allow the test and measurement instrument to connect to a device under test; and
a power supply block comprising multiple isolated power channels and an interface magnetic component having multiple windings, each winding connected to a separate one of the isolated power channels;
wherein each isolated power channel further comprises:
a full bridge rectifier electrically connected to one winding of the interface magnetic component to convert incoming power from the winding to a direct current signal;

a voltage regulator to regulate voltage from the full bridge rectifier to a desired level and polarity; and at least one output terminal to output a signal isolated from outputs of other isolated power channels wherein the full bridge rectifier of each isolated power channel connects to a center tap of the winding for that isolated power channel.

* * * * *